United States Patent
Ooishi et al.

(10) Patent No.: US 7,726,153 B2
(45) Date of Patent: Jun. 1, 2010

(54) METHOD OF MANUFACTURING GLASS PARTICULATE STACKED BODY

(75) Inventors: Toshihiro Ooishi, Kanagawa (JP);
Motonori Nakamura, Kanagawa (JP);
Tomohiro Ishihara, Kanagawa (JP);
Tatsuro Sakai, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 1090 days.

(21) Appl. No.: 10/511,547

(22) PCT Filed: Apr. 18, 2003

(86) PCT No.: PCT/JP03/04969

§ 371 (c)(1),
(2), (4) Date: Sep. 26, 2005

(87) PCT Pub. No.: WO03/086995

PCT Pub. Date: Oct. 23, 2003

(65) Prior Publication Data

US 2006/0086147 A1 Apr. 27, 2006

(30) Foreign Application Priority Data

Apr. 18, 2002 (JP) ............................. 2003-115789
Apr. 16, 2003 (JP) ............................. 2003-111369

(51) Int. Cl.
*C03B 19/01* (2006.01)
*C03B 19/09* (2006.01)
*C03B 19/06* (2006.01)
*C03B 37/07* (2006.01)

(52) U.S. Cl. ...................... 65/17.4; 65/17.3; 65/382
(58) Field of Classification Search .............. 65/17.3, 65/17.4, 382
See application file for complete search history.

(56) References Cited

U.S. PATENT DOCUMENTS 4,045,198 A * 8/1977 Rau et al. .................... 65/398

(Continued)

FOREIGN PATENT DOCUMENTS

EP 1065175 A1 * 1/2001

(Continued)

*Primary Examiner*—Khanh Nguyen
*Assistant Examiner*—Matthew Hoover
(74) *Attorney, Agent, or Firm*—McDermott Will & Emery LLP

(57) ABSTRACT

An object of the present invention is to provide a method for manufacturing a glass particle deposited body in which a taper portion formed at an end portion of the glass particle deposited body is reduced without increasing the number of burners.

The invention allows the glass particle deposited body to be manufactured in such a manner that a plurality of glass particle synthesizing burners are arranged to be opposed to a rotating starting rod, wherein the starting rod and the glass particle synthesizing burners are relatively reciprocated to move a turn-back location of reciprocating movement in a certain direction, and then move the turn-back location of reciprocating movement in the reverse direction if the turn-back location is moved to a predetermined position, until each burner is returned to an initial position, which operation is defined as one set of operation, with an average reciprocating movement distance of one set being less than double a burner-to-burner interval, whereby the glass particles are deposited on the starting rod by repeating one set of operation.

30 Claims, 7 Drawing Sheets

U.S. PATENT DOCUMENTS

| | | | | |
|---|---|---|---|---|
| 5,958,102 | A | * | 9/1999 | Shimada et al. ............... 65/382 |
| 6,047,564 | A | * | 4/2000 | Schaper et al. ............... 65/17.4 |
| 2002/0050154 | A1 | * | 5/2002 | Kase et al. .................... 65/377 |

FOREIGN PATENT DOCUMENTS

| JP | 3-228845 | 10/1991 |
|---|---|---|
| JP | 4-260618 | 9/1992 |
| JP | 10-158025 | 6/1998 |
| JP | 2001-019441 | 1/2001 |
| JP | 2001-031431 | 2/2001 |

* cited by examiner

METHOD OF MANUFACTURING GLASS PARTICULATE STACKED BODY

TECHNICAL FIELD

The present invention relates to a glass particle deposited body manufacturing method for manufacturing a glass particle deposited body, including radially depositing glass particles on a starting rod while reciprocating relatively the starting rod and the glass particle synthesizing burners. More particularly, this invention relates to a glass particle deposited body manufacturing method for manufacturing a glass particle deposited body in which the taper portions formed on an upper portion and a lower portion of the glass particle deposited body are smaller.

RELATED ART

Referring to FIG. 7, a method for manufacturing a large porous glass soot body at high speed will be described below. A plurality of glass particle synthesizing burners 7 are disposed at a fixed interval to be opposed to a starting rod 1 within a container 4. While the rotating starting rod 1 and a row of burners 7 are relatively reciprocated, glass particles are deposited like layers on the surface of the starting rod 1 to produce a glass particle deposited body 6. Undeposited glass particles and heat are exhausted out of the container 4. In an example of FIG. 7, the starting rod 1 is reciprocated vertically. The glass particle deposited body 6 is used for the optical fiber, with the taper portions 8 formed on the upper and lower sides. Further, the glass particle deposited body 6 is divided into an effective portion b that is used to produce the optical fiber by drawing the parent material and an ineffective portion a that is the defective unit.

In such method for manufacturing the glass particle deposited body, from the viewpoint of quality improvement, it is desired that there is less variation in the outer diameter of the glass particle deposited body over the longitudinal direction. From the viewpoint of productivity, the length of the taper portion formed at the end portion of the glass particle deposited body is desirably as short as possible.

As an example of reducing the variation in the outer diameter, there is a method for moving the start position of reciprocating movement every time of the reciprocating movement, in which the movement distance for one way of the reciprocating movement is made an amount of the burner interval. In this method, after the start position of the reciprocating movement is moved to a predetermined position, it is moved in the reverse direction and returned to the original position. Since a turn-back point of the reciprocating movement has a substantially longer deposition time, the turn-back points are distributed over the entire glass particle deposited body. A method for reducing variations in the outer diameter has been offered in which the deposition amount of glass particles is equalized over the longitudinal direction of the glass particle deposited body by making the deposition time of glass particles or the application time of burner flame to the glass particle deposited body consistent on average at each position of the glass particle deposited body (refer to patent document 1).

Another method for reducing variations in the outer diameter includes measuring the variation in the outer diameter over the whole of the glass particle deposited body, employing a CCD camera that can monitor the entire area of the glass particle deposited body and a central information processing unit, based on the method as disclosed in patent document 1. In this method, the portion having less deposition amount of glass particles is supplemented by depositing the glass particles, employing an auxiliary burner that can traverse the entire area of the glass particle deposited body singly, to reduce the variation in the outer diameter (refer to patent document 2).

Further, there is a method for reducing the temperature gradient in deposition in the longitudinal direction of the glass particle deposited body, including supplying a clean air over the entire area of the glass particle deposited body in depositing the glass particles while moving the start position of traverse (refer to patent document 3).

Moreover, there is a method for moving the turn-back location of reciprocating movement smoothly in which the row of burners installed on a first movement axis are reciprocated, and the first movement axis is placed on a second movement axis. This method involving moving the turn-back location has been proposed in which the reciprocating movement of each movement axis is a simple reciprocating movement with a fixed interval, and each movement axis has a different reciprocation distance or reciprocating movement speed, or both the different distance and speed (refer to patent document 4 and patent document 5).

[Patent document 1]
 JP-A-3-228845
[Patent document 2]
 JP-A-10-158025
[Patent document 3]
 JP-A-4-260618
[Patent document 4]
 JP-A-2001-19441
[Patent document 5]
 JP-A-2001-31431

In the case of the method for moving the turn-back location of traverse as disclosed in patent document 1, the relative position between the starting rod and the burners, and the number of deposited layers, are illustrated in FIG. 8. The deposition shape of glass particles deposited by the burners located at both ends of the glass particle deposited body is tapered (the number of deposited layers is smaller at the farther end portion).

FIG. 8 shows a portion of an outside burner 2 located most outwards and a second burner 3 in the row of burners, in which an outside burner on the opposite side and its inside burner are in the same situation. The numerical value on the right side indicates the number of deposited layers of glass particles formed on the starting rod 1 through a series of reciprocating movements (one set of reciprocating movements) until the turn-back location is returned to the initial position. In an example of FIG. 8, the turn-back location is reciprocated ten times during one set of reciprocating movements, in which the number of deposited layers is twenty layers at maximum. Since a lower portion under the twenty layers in FIG. 8 is deposited by the third and subsequent burners, twenty layers are kept except for a lower end portion. Principally, the number of deposited layers is smaller only in a portion where glass particles are deposited by the burner at the end. However, in practice, since glass particles are deposited in tapered shape at the end portion of the glass particle deposited body, the glass particles by the second burner from the end flow outwards to cause most of the glass particles to be deposited in tapered shape, resulting in an increased taper portion that is the ineffective portion. With the methods of patent documents 2 and 3 employing the same reciprocating movement methods, the taper portion of the same shape is formed.

Further, the time of finishing the glass particle deposition process optimally takes place at the moment when the number of deposited layers in the stationary portion becomes uniform. However, if the turn-back location is densely dispersed, the number of layers is increased by the time when the number of deposited layers becomes uniform, whereby it is difficult to adjust the deposition amount of glass particles. Therefore, in the patent document 1, it was disclosed that the dispersion interval of the turn-back location is increased, when the deposition amount comes closer to a target amount, to adjust the deposition amount of glass particles. However, this method may degrade an outer diameter stabilizing effect with the dispersion of the turn-back location.

In the methods of patent documents 4 and 5 that are different in the deposition form of glass particles from the methods of patent documents 1 to 3, the burners are moved along two movement axes, resulting in a complex control system. The number of deposited layers in the stationary portion is varied depending on differences in the movement distance and the moving speed between two movement axes, but the number of deposited layers does not become uniform, so that a portion having a different number of deposited layers appears alternately, or additionally another portion having a further different number of deposited layers appears. With this method, for example, if the movement distances of the first and second movement axes are integral multiples of the burner interval, the portion having different number of deposited layers appears alternately, whereby if the alternate appearing interval is made smaller, the outside diameter is stabilized. However, with this method, the ineffective portion having a length of integral multiple of the burner interval is formed at either end portion of the glass particle deposited body.

One method for solving an increase in the taper portion involves narrowing the burner interval, and increasing the number of burners correspondingly. In this manner, the deposition interval of glass particles by the outside burner and the second burner is smaller, making it possible to reduce the taper portion. However, if the burner interval is smaller, it is required to increase the number of burners to produce the glass particle deposited body having the effective portion of the same length. Therefore, a gas supply system is augmented, whereby the installation cost is increased.

Moreover, if the burner flames interfere with each other, the deposition efficiency of each burner becomes unstable to cause variations in the outer diameter. Therefore, there is a limitation in shortening the burner interval, and no drastic effect of reducing the taper portion is expected.

It is an object of the invention to provide a glass particle deposited body manufacturing method for manufacturing a glass particle deposited body in which the taper portion formed at the end portion is reduced without increasing the number of burners.

DISCLOSURE OF THE INVENTION

The present invention provides a glass particle deposited body manufacturing method for manufacturing a glass particle deposited body, in which a plurality of glass particle synthesizing burners are arranged to be opposed to a rotating starting rod, characterized in that the starting rod and the glass particle synthesizing burners are relatively reciprocated to move a turn-back location of reciprocating movement in a certain direction, and then move the turn-back location of reciprocating movement in the reverse direction if the turn-back location is moved to a predetermined position, until each burner is returned to an initial position, which operation is defined as one set of operation, with an average reciprocating movement distance of the one set being less than double a burner-to-burner interval, whereby the glass particles are deposited on the starting rod by repeating the one set of operation.

In the glass particle deposited body manufacturing method according to the invention, it is desirable that the movement distance of the turn-back location of reciprocating movement each time is an almost equal interval.

Further, in the glass particle deposited body manufacturing method according to the invention, it is desirable that one set of operation is defined as the operation in which when the turn-back location of reciprocating movement is moved to a predetermined position, each burner is returned to an initial position in the next movement.

Further, in the glass particle deposited body manufacturing method according to the invention, it is desirable that one set of operation is defined as the operation in which each burner is moved to a predetermined position and turned back in the first movement, and then the turn-back location of reciprocating movement is moved in the direction to the initial position of each burner, until each burner is returned to the initial position.

Further, in the glass particle deposited body manufacturing method according to the invention, it is desirable that the movement distance of the turn-back location of reciprocating movement is changed in the one set of operation.

Further, in the glass particle deposited body manufacturing method according to the invention, it is desirable that the turn-back location of reciprocating movement has a movement range of about n (n is an integer from 1 to 3) times the burner interval.

Further, in the glass particle deposited body manufacturing method according to the invention, it is desirable that the turn-back location of reciprocating movement has a movement range of about n (n is an integer from 1 to 3) times the burner interval shorter by the minimum movement distance of the turn-back location in the one set of operation.

Further, in the glass particle deposited body manufacturing method according to the invention, it is desirable that the average movement distance of the turn-back location of reciprocating movement each time in one set of operation is about one–(m+1)th (m is a natural number) the burner interval.

Further, in the glass particle deposited body manufacturing method according to the invention, it is desirable that assuming that the average movement distance of the turn-back location of reciprocating movement each time in one set of operation is Amm, and the average reciprocating movement distance in one set of operation is Dmm, A falls within a range from 5 to 60 mm, and D falls within a range $4 \times A \leq D \leq 240$.

Further, in the glass particle deposited body manufacturing method according to the invention, it is desirable that the glass particle deposition end time is set at the time when the number of deposited layers on a stationary portion is almost uniform in the reciprocating movement.

Further, in the glass particle deposited body manufacturing method according to the invention, it is desirable that the reciprocating movement speed at which a target deposition amount of glass particles is achieved at the glass particle deposition end time is decided from the relationship between the reciprocating movement speed and the weight of glass particles deposited by the glass particle deposition end time, whereby the target deposition amount is achieved at the glass particle deposition end time by depositing glass particles at the decided speed.

Further, it is desirable that a glass parent material is manufactured by producing the glass particle deposited body by the glass particle deposited body manufacturing method, and heating and vitrifying the produced glass particle deposited body.

The present inventors have made various examinations for the reciprocating movement method to make the length of the taper portion as short as possible, and found that if the average reciprocating movement distance in one set of operation is less than double the burner interval, the glass particle deposited body having less taper portion is manufactured efficiently. It is desirable that assuming that the movement distance of the turn-back location of reciprocating movement is Amm, and the average reciprocating movement distance in one set of operation is Dmm, A falls within a range from 5 to 60 mm, and D falls within a range $4 \times A \leq D \leq 240$.

Herein, the average reciprocating movement distance in one set means the average distance of reciprocating movement in which the total movement distance in one set is divided by the number of reciprocations in one set.

Further, the turn-back location of reciprocating movement means the location at which the starting rod is turned back from the outward path (where the burner is relatively moved in the direction away from the initial position) to the homeward path (where the burner is relatively moved in the direction to the initial position).

Figure 1:
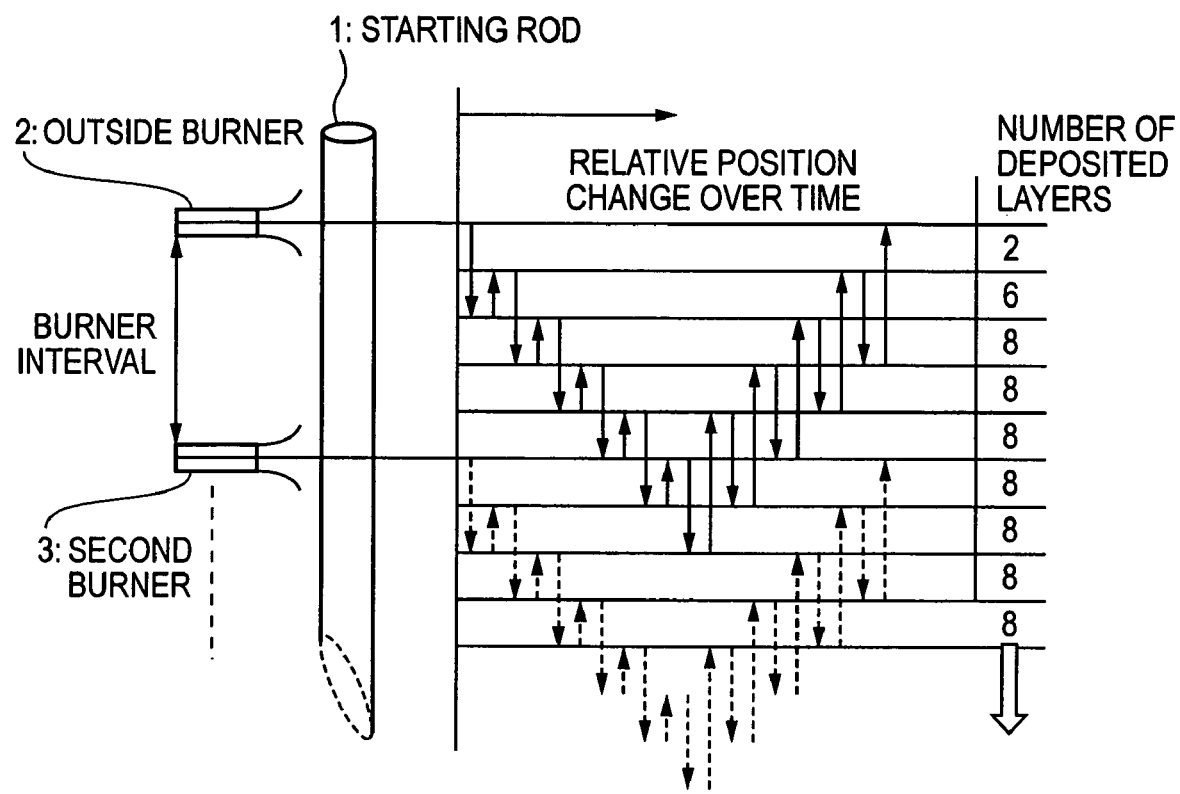
FIG. 1 is an explanatory view showing one example of a situation in which the starting rod and the burners are relatively moved in a method of this invention.

In the drawings, reference numeral 1 denotes a starting rod, 2 denotes an outside burner, 3 denotes a second burner, 4 denotes a container, 5 denotes an exhaust port, 6 denotes a glass particle deposited body, 7 denotes the burners, 8 denotes a taper portion, a denotes an ineffective portion, and b denotes an effective portion.

BEST MODE FOR CARRYING OUT THE INVENTION

The basic reciprocating movement in the methods of the present invention has any one of the following movement forms 1 to 4. The first movement form is that the movement distance of a turn-back location of reciprocating movement each time is almost equal. The second movement form is that one set of operation is defined as the operation in which when the turn-back location of reciprocating movement is moved to a predetermined position by repeating the reciprocating movement, each burner is returned to the initial position in the next movement. The third movement form is that one set of operation is defined as the operation in which each burner is moved to a predetermined position in the first movement and turned back, and subsequently the turn-back location of reciprocating movement is moved in the direction to the initial position of each burner, until each burner is returned to the initial position. Further, the fourth movement form is that the movement distance of the turn-back location of reciprocating movement is changed in one set of operation.

In the first movement form, the number of deposited layers in a stationary portion becomes almost uniform in the longitudinal direction at two points of time when the turn-back location is moved to the predetermined position and when each burner is returned to the initial position in one set of operation.

In an optimal embodiment of the first movement form, assuming that the movement distance of the turn-back location each time is A(mm), the reciprocating movement is defined as the outward path $2 \times A$ and the homeward path A. And the movement of the turn-back location is repeated in the same direction, and when the turn-back location is moved beyond the burner interval, the outward path of the reciprocating movement remains $2 \times A$, but the homeward path alone is made $3 \times A$. Then, the turn-back location is moved in the reverse direction to return to the first position. This series of reciprocating movement is defined as one set of operation. Thereby, the glass particles are deposited by repeating one set of operation. Thus, the average distance for one way of the reciprocating movement is $2 \times A$, and the movement distance of the turn-back location each time is Amm. In this manner, the length of the portion having less number of deposited layers only exists by each $2 \times A$ at either end of the glass particle deposited body, so that the taper is shortest. This principally shortest taper length is called a principal taper length. In this case, the principal taper length is $2 \times A$. In reality, however, since glass particles flow along the taper shape, the taper shape is larger than $2 \times A$. If the outward path is $3 \times A$ and the homeward path is $2 \times A$, and after the turn-back location is moved by the burner interval, the outward path is $3 \times A$ and the homeward path is $4 \times A$ (average distance for one way of the reciprocating movement is $3 \times A$), the portion having less number of deposited layers is $3 \times A$ each at either end of the glass particle deposited body (principal taper length is $3 \times A$). However, if the principal taper length is smaller than about 120 mm, the glass particles flow along the taper slope, so that the deposition efficiency is predominantly worse, whereby the actual taper length is hardly changed when the principal taper length is 2A or 3A.

However, if the average distance for one way of the reciprocating movement is increased such as $4 \times A$, $5 \times A$, . . . , the principal taper length is also increased such as $4 \times A$, $5 \times A$, . . . . In practice, if the length of the portion having less number of deposited layers is increased and the principal taper length is longer to some extent, the taper length begins to be longer, without regard to the influence of the glass particles flowing along the taper portion. Assuming that the movement distance of the turn-back location is Amm, and the coefficient indicating the average distance for one way of the reciprocating movement is B, $(B+1) \times A = C$ mm (B=1, 2, 3 . . . ) is defined, whereby C exists at which the taper length begins to remarkably increase.

Though C is more or less changed depending on the shape of burner, if C is at least within about 120 mm, the taper length is kept from being greatly longer. A desirable range is 5 mm≦A≦60 mm to suppress variations in the outer diameter at the turn-back location, and an optimal range is 2×A≦(B+1)×A≦120. Herein, the lower limit 2×A is the principal lower limit. Further, to suppress variations in the outer diameter, a more preferable A is 5≦A≦40. The average distance D of the reciprocating movement is D=2×(B+1)×Amm (B=1, 2, . . . ), which leads to (B+1)×A=D÷2. Substituting it for the desirable range 2×A≦(B+1)×A≦120, this inequality is rearranged for the average distance of the reciprocating movements so that 4×A≦D≦240.

In an optimal embodiment of the second movement form, the reciprocating movement is defined as the outward path 2×A and the homeward path A. And the movement of the turn-back location is repeated in the same direction, and if the turn-back location is moved to a position far from the initial position of the reciprocating movement by a distance of the burner interval plus Amm, the distance of the homeward path of the reciprocating movement is defined as the burner interval plus Amm, and the burner returns to the initial position. This series of reciprocating movement is defined as one set of operation. And the glass particles are deposited by repeating this set of operation. The average distance for one way of the reciprocating movement is 2×A, and the movement distance of the turn-back location each time is Amm until the turn-back location is moved to the position Amm farther away from the burner interval.

In an optimal embodiment of the third movement form, the turn-back location is moved to the position Amm farther away from the burner interval in the first movement. Thereafter, the reciprocating movement is defined as the homeward path 2×A and the outward path A, the movement distance of the turn-back location each time is made Amm. And the turn-back location is moved to the initial position by repeating the reciprocating movement. This series of reciprocating movements is defined as one set of operation. And the glass particles are deposited by repeating this set of operation. The average distance for one way of the reciprocating movement is 2×A.

Further, in an optimal embodiment of the fourth movement form, the movement distance of the turn-back location each time is Amm as the basic reciprocating movement, but exceptionally, the movement distance of the turn-back location in one set of operation each time is longer than A. The outward path is 2×A and the homeward path is A, and after the turn-back location is moved to the position Amm shorter from the burner interval, the outward path is A and the homeward path is 2×A, whereby the movement distance of the turn-back location each time is basically Amm. However, the movement with the outward path 4×A and the homeward path 4×A are randomly involved. The average distance for one way of the reciprocating movement is 2×A.

In the second to fourth embodiments, the length of the portion having less number of deposited layers only exists A each at either end of the glass particle deposited body (principal taper length A), whereby the taper length is shortest. However, in reality, the taper shape is larger than A. As in the first embodiment, when the principal taper length is as short as 2A or 3A, the actual taper length is scarcely changed.

Further, when the coefficient indicating the average movement distance for one way of the reciprocating movement is B, (B+1)×A=Cmm (B=1, 2, 3 . . . ) is defined, whereby C exists in which the taper length begins to remarkably increase.

As in the first movement form, C is desirably within about 120 mm, and in consideration of 5≦A≦60 mm for stabilization of the outer diameter, a desirable range of the average distance D in the reciprocating movement is 4×A≦D≦240, which is derived in the same manner as the first pattern.

In the inventions of the patent documents 1 to 5, the reciprocating movement distance (one way) has a lower limit of the rough burner interval. This indicates that a multilayer deposition method is stuck on an idea that one glass layer must be formed over the entire range of the effective portion every time of the reciprocating movement for the one glass layer. However, this invention is based on a converted idea that one glass layer may not be formed over the entire range of the effective portion every time of the reciprocating movement for the one glass layer, but it is only necessary that the deposition thickness is made uniform before a difference in the deposition thickness is remarkable. In one set of operation of moving the turn-back location, a glass particle deposited layer having uniform thickness is formed at least once or more times. The effect of the difference in the ideas makes it possible to greatly reduce the ineffective portion (tapered portion) that is possibly difficult to reduce and has not been disclosed in the invention.

In the method of this invention, the turn-back location of reciprocating movement is moved stepwise in a range from the nearest position to the initial burner position to the farthest position (predetermined position) from the initial burner position for every reciprocating movement. To make the stationary portion (effective portion) smoother, a predetermined distance by which this turn-back location is moved (the distance between the turn-back location nearest to the initial burner position and the turn-back location farthest away from the initial burner position) is about n (n is an integer from 1 to 3) times the burner interval in the first movement form. In the second to fourth movement forms, the predetermined distance is preferably about n (n is an integer from 1 to 3) times the burner interval shorter by the minimum movement distance in one set. The predetermined distance is preferred especially when n is 1, because the length of the ineffective portion is shortest, and the deposition efficiency is excellent. Like the second or third movement form, in a pattern in which the burner is moved between the initial position and the farthest position by one time of operation, the turn-back location is heated by one burner and then heated by the adjacent burner in a shorter time. In this case, there is the possibility that the temperature of the heated portion rises, and the bulk density is greater. However, there is less influence when n is 2 or 3 than when n is 1, bringing about the effect that the smoothness is improved.

As with the conventional technique, if n is increased, the smoothness of the effective portion is improved, but the length of the ineffective portion is longer and the deposition efficiency is degraded. However, in this invention, even if the smoothness is kept equivalently to the conventional technique by selecting the same integral multiple as in the conventional technique, the length of the ineffective portion is shorter by the rough burner interval than in the conventional technique, and the deterioration of the deposition efficiency is small.

In the conventional technique in which the average reciprocating movement distance is double the burner interval, when the predetermined distance by which the turn-back location is moved is n times the burner interval, the length of the ineffective portion is n times the burner interval. In this invention in which the average reciprocating movement distance is less than double the burner interval, the length of the ineffective portion is smaller than the burner interval when n is equal to 1. When n is equal to 2 or 3, the length of the ineffective portion is slightly larger than the rough burner interval or double the burner interval, and shorter than n times the burner interval in the conventional technique. It is preferable that n is 2 or less. When n is equal to 2, the length of the ineffective portion is as much as about the burner interval, while the smoothness is kept as excellent as double in the conventional technique. Moreover, most preferably, when n is equal to 1, the length of the ineffective portion is shorter than or equal to the burner interval, in which the shortest ineffective portion is made, though it was not realized by the conventional technique.

Figure 8:
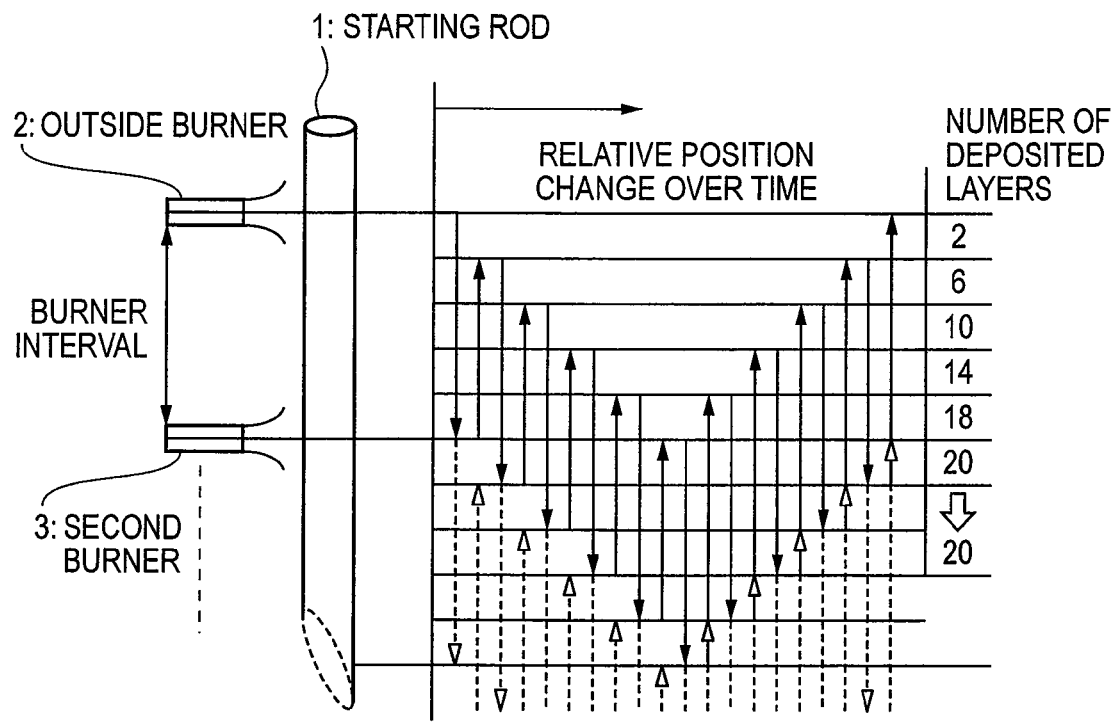
FIG. 8 is an explanatory view showing one example of a situation in which the starting rod and the burners are relatively moved in the conventional method.

FIG. 1 shows one example of a situation where the relative position between the starting rod and the burner is changed with the elapse of time in the first movement form. To facilitate a comparison with FIG. 8 showing an example of the conventional technique, FIG. 1 shows a portion of the outside burner located most outwards in the row of burners and the second burner 3, in which the burner interval is divided into five partitions (the outside burner on the opposite side and its inner burner are in the same situation). The numerical value on the right side in FIG. 1 indicates the number of deposited layers of glass particles formed on the starting rod 1 through a series of reciprocating movements (one set of reciprocating movements) until the turn-back location is returned to the start position.

In the example of FIG. 1, the turn-back location is moved by two partitions in one direction, then returned by one partition in the former half part of one set of reciprocating movements, and moved by two partitions in one direction, then returned by three partitions in the latter half part, so that the turn-back location is returned to the initial relative position. In this case, the number of deposited layers is 2, 6, 8, 8, 8 . . . as indicated on the right side of FIG. 1, and the portion having less number of deposited layers in the effective portion takes place in only two partitions within the burner interval at the end portion of the parent material for the glass particle deposited body.

In the case of this turn-back method, to further enhance the effect of dispersing the turn-back locations, even if the number of partitions within the burner interval is increased, the portion having less number of deposited layers only exists in two partitions located at the end portion of the parent material.

Namely, if the number of partitions increases, the length of the portion having less number of deposited layers becomes shorter.

For example, for a burner interval of 200 mm, the turn-back location is moved by every 40 mm, in which the interval is divided into five partitions (200 mm÷40 mm=5 partitions) in FIG. 1. In this case, the length of the portion having less number of deposited layers is 40 mm×2 partitions=80 mm. In order to further enhance the dispersion effect, the turn-back location is dispersed at an interval of 20 mm. The burner interval of 200 mm is divided into 10 partitions (200 mm÷20 mm=10 partitions), whereby the length of the portion having less number of deposited layers is 20 mm×2 partitions=40 mm. With the conventional technique in which the movement distance in one direction every time is almost equal to the burner interval, the number of deposited layers is less sufficient over the total interval of 200 mm, whereas with this method, the length of the portion having less number of deposited layers is only 40 mm. The effect of decreasing the length of the portion having less number of deposited layers is increased as the burner interval is longer.

Further, in the first movement form, there is the effect of reducing the number of deposited layers formed through one set of a series of reciprocating movements to disperse the turn-back location of reciprocating movement over the total length of the glass particle deposited body. That is, with the conventional technique of FIG. 8, 20 layers of glass particles are deposited on the effective portion through one set of reciprocating movements, whereas with the method of the invention of FIG. 1, eight layers are only deposited.

With the method of FIG. 1, the number of deposited layers is always 8 layers in the effective portion through one set of reciprocating movements. On the contrary, with the conventional manufacturing method, if the movement distance of the turn-back location is shorter to enhance the dispersion effect, or if the burner interval is longer, the number of deposited layers in the effective portion is increased for one set. For example, the number of deposited layers is increased such as 20 layers for five partitions, 24 layers for six partitions, or 28 layers for seven partitions.

In the conventional technique in which the average reciprocating movement distance is double the burner interval and the first movement form, there is a point of time for every half set at which the dispersion of the turn-back location and the number of deposited layers in the effective portion are uniform, whereby the glass particle deposition process is preferably ended at this point of time. A difference in the number of deposited layers (≡deposited glass weight) as compared with the conventional technique (number of deposited layers in the first movement form÷number of deposited layers in the conventional technique) is 2/5 for 5 partitions, 1/3 for 6 partitions, or 2/7 for 7 partitions. In the first movement form, even if the number of dispersing the turn-back location is increased to stabilize the outer diameter, the deposition amount of glass particles is adjusted finely.

Figure 2:
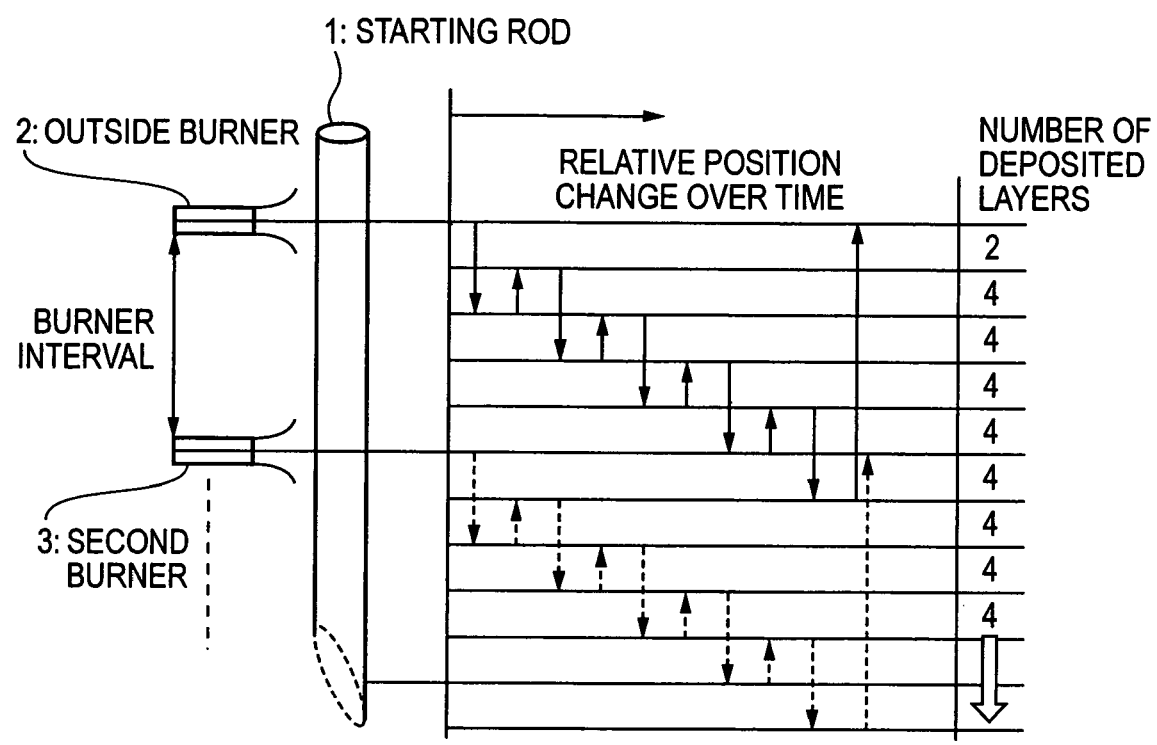
FIG. 2 is an explanatory view showing another example of a situation in which the starting rod and the burners are relatively moved in the method of this invention.

FIG. 2 shows one example of a situation where the relative position between the starting rod and the burner is changed with the elapse of time in the second movement form. To facilitate a comparison with FIG. 8 showing the conventional technique, FIG. 2 shows a portion of the outside burner located most outwards and the second burner 3 in the row of burners in the example of dividing the burner interval into 5 partitions (the outside burner on the opposite side and its inner burner are in the same situation). The numerical value on the right side in FIG. 2 indicates the number of deposited layers of glass particles formed on the starting rod 1 through a series of reciprocating movements (one set of reciprocating movements) until the turn-back location is returned to the start position.

In the example of FIG. 2, the turn-back location of reciprocating movement is moved by a distance of two partitions in one direction, then returned by a distance of one partition, and then moved by a distance of the burner interval plus one partition in the former half part of one set of reciprocating movements, and returned to the initial relative position in the next movement. The turn-back location of reciprocating movement is moved by a distance of one partition every time to a predetermined position far from the initial position of the reciprocating movement by a distance of the burner interval plus one partition. In this case, the number of deposited layers is 2, 4, 4, 4, 4 . . . as indicated on the right side of FIG. 2, and the portion having less number of deposited layers in the effective portion takes place in only one partition within the burner interval at the end portion of the glass particle deposited body.

In the case of this turn-back method, to further enhance the dispersion effect, like the first movement form, even if the number of partitions within the burner interval is increased, the portion having less number of deposited layers exists in only one partition located at the end portion of the parent material. That is, if the number of divisions is increased, the length of the portion having less number of deposited layers is further shorter.

For example, for a burner interval of 200 mm, the turn-back location is moved by every 40 mm, which corresponds to five partitions as the number of dividing the interval in FIG. 2 (200 mm÷40 mm=5 partitions). In this case, the length of the portion having less number of deposited layers is 40 mm×1 partition=40 mm. In order to further enhance the dispersion effect, if the turn-back location is dispersed at an interval of 20 mm, the burner interval of 200 mm is divided into 10 partitions (200 mm÷20 mm=10 partitions), whereby the length of the portion having less number of deposited layers is 20 mm×1 partition=20 mm.

Moreover, in the second movement form as shown in FIG. 2, like the first embodiment, even if the number of dispersing the turn-back location is increased, the number of deposited layers in the effective portion that is deposited through one set is not increased but always remains four layers, whereby the deposition amount of glass particles is adjusted finely as in the first embodiment.

Figure 3:
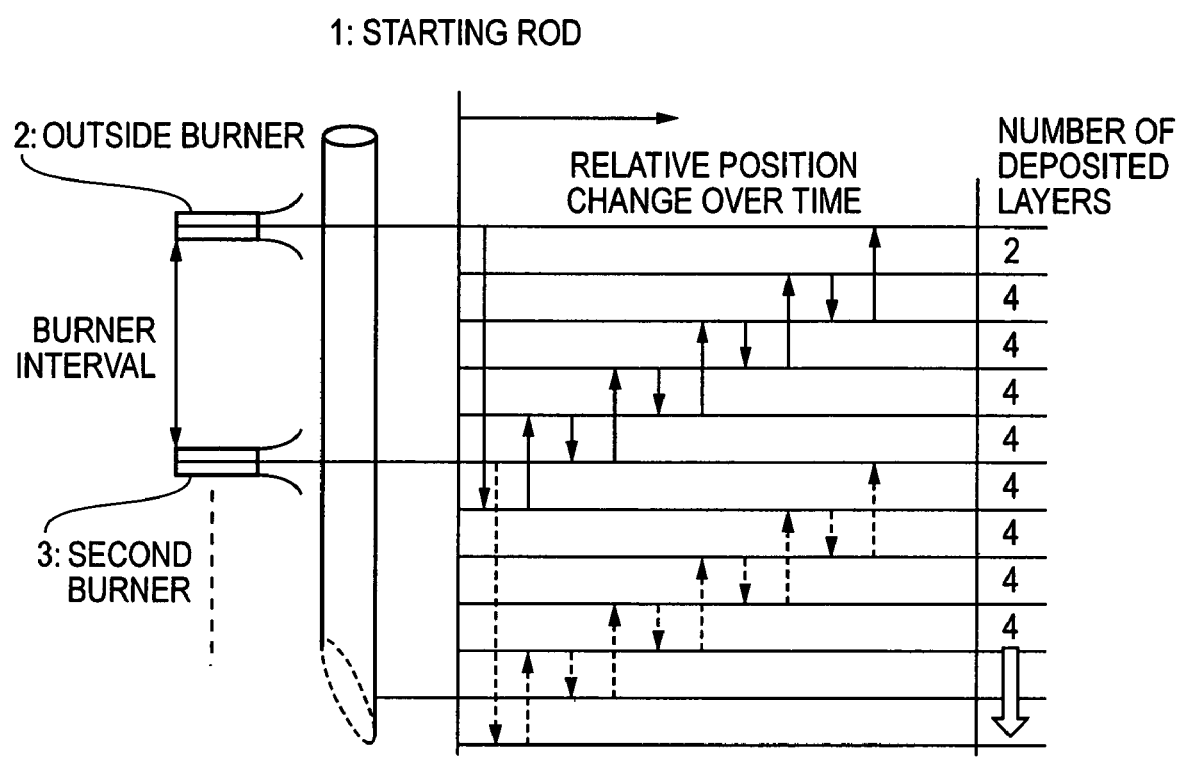
FIG. 3 is an explanatory view showing another example of a situation in which the starting rod and the burners are relatively moved in the method of this invention.

FIG. 3 shows one example of a situation where the relative position between the starting rod and the burner is changed with the elapse of time in the third movement form. To facilitate a comparison with FIG. 8 showing an example of the conventional technique, FIG. 3 shows a portion of the outside burner located most outwards and the second burner 3 in the row of burners, in which the burner interval is divided into five partitions (the outside burner on the opposite side and its inner burner are in the same situation). The numerical value on the right side in FIG. 3 indicates the number of deposited layers of glass particles formed on the starting rod 1 through a series of reciprocating movements (one set of reciprocating movements) until the turn-back location is returned to the start position.

In the example of FIG. 3, the turn-back location is moved to a position one partition farther away from the burner interval in the first movement of one set and turned back by two partitions, then moved by one partition, and returned by two partitions. By repeating this operation, the turn-back location is returned to the initial relative position. In the first movement, each burner is moved to the predetermined position and turned back. Thereafter, the turn-back location of reciprocating movement is moved one partition every time in the direction to the initial position of each burner. In this case, the number of deposited layers is 2, 4, 4, 4, 4 . . . as indicated on the right side of FIG. 3, and the portion having less number of deposited layers in the effective portion takes place in only one partition within the burner interval at the end portion of the glass particle deposited body.

In the case of this turn-back method, to further enhance the dispersion effect, like the first and second movement forms, even if the number of partitions within the burner interval is increased, the portion having less number of deposited layers exists in only one partition located at the end portion of the glass particle deposited body. That is, if the number of divisions is increased, the length of the portion having less number of deposited layers is further shorter.

In the third movement form as shown in FIG. 3, like the first and second movement forms, even if the number of dispersing the turn-back location is increased, the number of deposited layers in the effective portion that is deposited through one set is not increased but always remains four layers, whereby the deposition amount of glass particles is adjusted finely as in the first and second embodiments.

Figure 4:
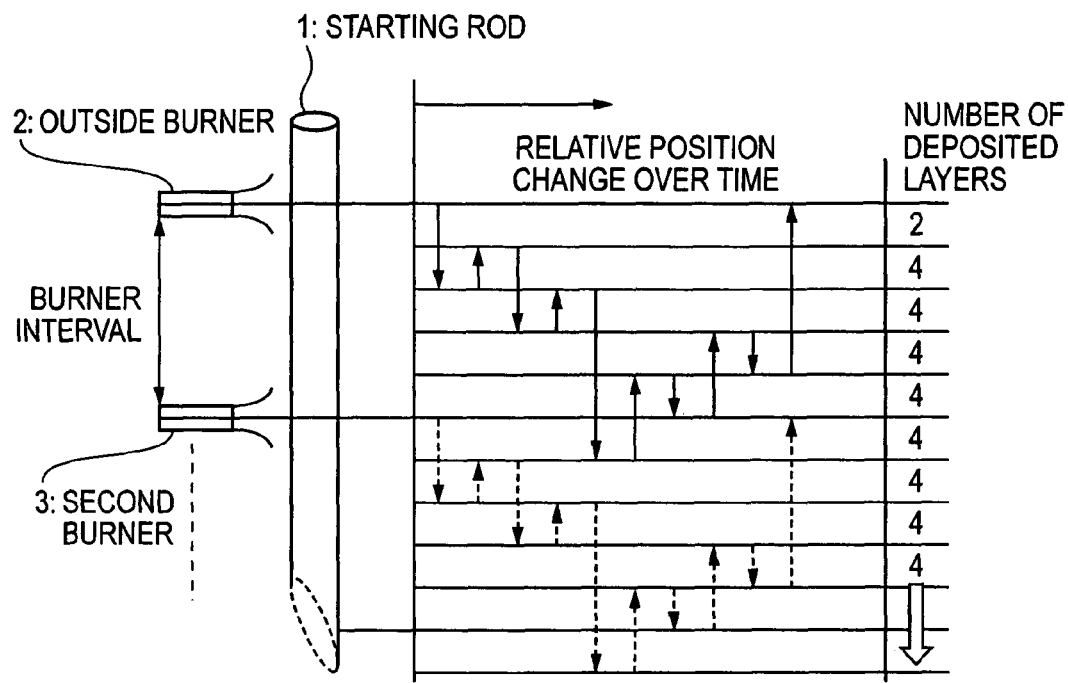
FIG. 4 is an explanatory view showing another example of a situation in which the starting rod and the burners are relatively moved in the method of this invention.
Figure 4:
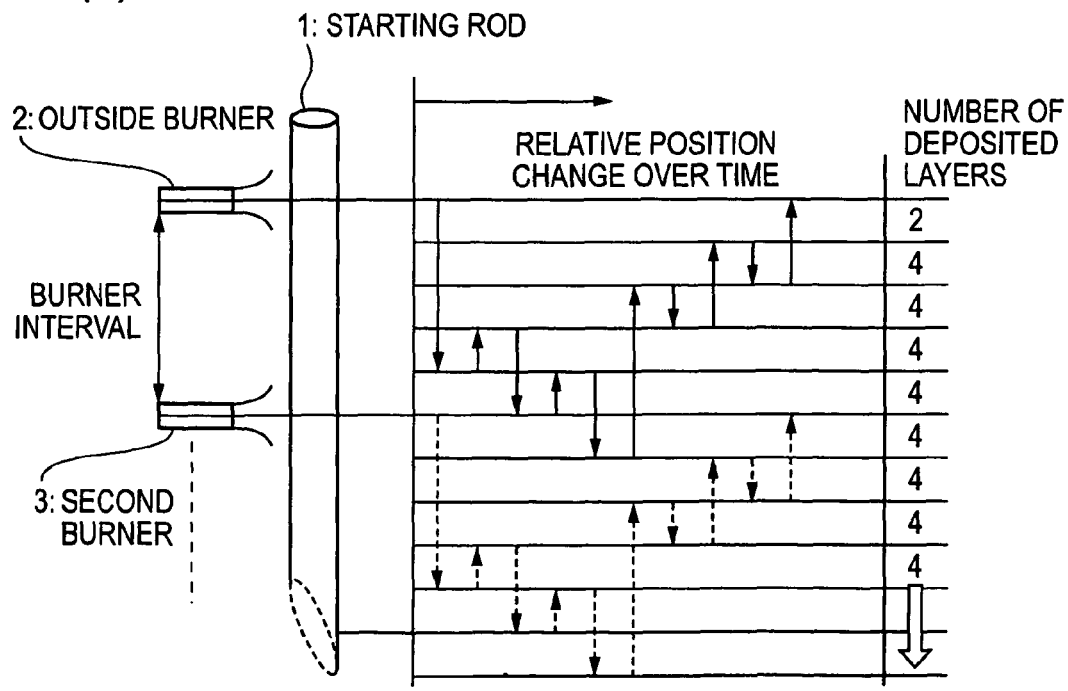

FIGS. 4(a) and 4(b) show the examples of a situation where the relative position between the starting rod and the burner is changed with the elapse of time in the fourth movement form. To facilitate a comparison with FIG. 8 showing an example of the conventional technique, FIG. 4 shows a portion of the outside burner 2 located most outwards and the second burner 3 in the row of burners, in which the burner interval is divided into five partitions (the outside burner on the opposite side and its inner burner are in the same situation). The numerical value on the right side in FIG. 4 indicates the number of deposited layers of glass particles formed on the starting rod 1 through a series of reciprocating movements (one set of reciprocating movements) until the turn-back location is returned to the start position.

In an example of FIG. 4(a), the turn-back location is moved to a position far from the initial position of the reciprocating movement by a distance of two partitions in one direction and returned one partition in the former half part of one set of reciprocating movements, which operation is repeated twice. Thereafter, the turn-back location is moved by a distance of four partitions, so that the turn-back location of reciprocating movement is moved by a distance of the burner interval plus one partition far from the initial position. In the latter half part, the reciprocating movement with the homeward path of a distance of two partitions and the outward path of a distance of one partition is repeated twice, and returned to a position by a distance of four partitions in the next movement back to the initial relative position. The movement distance of the turn-back location of reciprocating movement includes such as one partition, three partitions, one partition, and three partitions in one set. The order in the movement is not this order. In this case, the number of deposited layers is 2, 4, 4, 4, 4 . . . as indicated on the right side of FIG. 4, and the portion having less number of deposited layers in the effective portion takes place in only one partition within the burner interval at the end portion of the glass particle deposited body. An example of FIG. 4(b) is the same in the state of forming the deposited layers as the example of FIG. 4(a), except that the pattern for changing the movement distance of the turn-back location is different.

In the case of this turn-back method, to further enhance the dispersion effect, like the first to third movement forms, even if the number of partitions within the burner interval is increased, the portion having less number of deposited layers exists in only one partition located at the end portion of the glass particle deposited body. That is, if the number of divisions is increased, the length of the portion having less number of deposited layers is further shorter.

In the fourth movement form as shown in FIG. 4, like the first to third movement forms, even if the number of dispersing the turn-back location is increased, the number of deposited layers in the effective portion that is deposited through one set is not increased but always remains four layers, whereby the deposition amount of glass particles is adjusted finely as in the first to third embodiments.

In the method of the invention, the average movement distance of the turn-back location of reciprocating movement each time in one set is preferably the length of about one–(m+1)th (m is a natural number) the burner interval. In this manner, one set of reciprocating movements is ended at the initial position of reciprocating movement, and the length of the taper portion is shortest. If the movement distance each time is greatly out of the length of about one–(m+1)th (m is a natural number) the burner interval, the number of deposited layers is unpreferably changed in an overlapping portion with the adjacent burner. Herein, about one–(m+1)th (m is a natural number) the burner interval means one–(m+1)th (m is a natural number) the "burner interval±burner thickness".

The movement distance of the turn-back location of reciprocating movement is preferably within a range from 5 to 60 mm, and more preferably within a range from 5 to 40 mm. If the movement interval of the turn-back location of the burner is less than 5 mm, the variation in the outer diameter occurs, before the dispersion effect of the turn-back location appears. Beyond 60 mm, the dispersion effect of the turn-back location is reduced.

Moreover, to reduce the variation in the outer diameter, the glass particle deposition process is desirably ended at a point of time when the number of deposited layers and the dispersion density of the turn-back location in one set are uniform in which the greatest dispersion effect is possibly attained. This optimal deposition end time exists twice in one set in the conventional technique and the first deposition form, or once in the second to fourth movement forms. That is, the end time of glass particle deposition is desirably the point of time when the number of deposited layers in the effective portion and the dispersion of the turn-back location are uniform, which exists twice in one set in the first movement form, or desirably the point of time when the integral number of sets of reciprocating movements are ended in the second to fourth movement forms. Assuming that the weight of glass particles deposited from this optimal end time to the next optimal end time is Mkg, the weight of the glass particle deposited body at the time when the deposition of glass particles is ended is adjusted only by every Mkg. With the method of the invention, the number of layers of glass particles deposited from the time when the number of deposited layers in the effective portion and the dispersion of the turn-back location are uniform to the next time when the number of deposited layers in the effective portion and the dispersion of the turn-back location are uniform at the next time is smaller than conventionally. Accordingly, the weight of the glass particle deposited body is reduced, and the deposition amount of glass particles is adjusted finely. Thereby, the glass particle deposited body having a desired weight is obtained.

On the other hand, with the conventional manufacturing method, to enhance the dispersion effect, if the movement distance of the turn-back location is shorter, the number of deposited layers of glass particles required to disperse the turn-back location over the total length of the glass particle deposited body is increased. As the number of deposited layers is greater at the optimal end time, it is more difficult to reduce the weight M, and produce the glass particle deposited body having desired weight.

Moreover, the reciprocating movement speed to achieve the target deposition amount of glass particles at the deposition end time of glass particles is decided from the relationship between the reciprocating movement speed and the weight of glass particles deposited till the deposition end of glass particles. When the glass particles are deposited at that speed, the target deposition amount is achieved at the deposition end time of glass particles, whereby the deposition amount of glass particles is controlled more effectively.

This invention is not limited to the above embodiments. In the description of the above embodiments, the outward path is from up to down, but may be reversely directed.

Further, the glass particle synthesizing burner does not necessarily produce the glass particles through the chemical reaction of a glass source gas in a flame. Persistently, it is employed as a generic name of a mechanism for supplying the glass particles to the starting rod, and having a depositing and bonding function.

The glass particle deposited body produced by the above method is heated and sintered by well-known methods, and vitrified to produce the glass parent material. The obtained glass parent material is employed as a light propagating component, for example.

EXAMPLES

The method of the invention will be further described in more detail by way of example, but the invention is not limited to those examples.

Comparative Example 1

Employing a longitudinal glass particle depositing device in which one row of four burners are arranged at an interval of 200 mm to be opposed to a starting rod, the starting rod was reciprocated vertically to deposit the glass particles. The starting rod had a diameter of 36 mm, and the reciprocating movement was made in a pattern as shown in FIG. 8. The starting rod was moved 200 mm downward, and then 180 mm upward, so that the turn-back location of reciprocating movement was moved by every 20 mm downward. After the turn-back location was moved downward by an amount of burner interval, the downward movement distance was kept at 200 mm, and the upward movement distance was 220 mm, so that the turn-back location was moved upward by every 20 mm, until it was returned to the initial position, which operation was defined as one set. The glass particles were deposited by repeating forty sets of operation.

The produced glass particle deposited body for optical fiber had a total length of 1100 mm, and an outer diameter of 240 mm. The effective portion (having a constant outer diameter with a core) had a length of 500 mm, and the taper portion formed at either end portion had a length of 300 mm. Principally, the taper portion at either end portion has a length of 200 mm, but practically, glass particles will flow outwards along the taper, so that the taper portion is also formed inside (50 mm at either end portion in this case) of the effective portion (600 mm).

Example 1

Employing the same starting rod and the same glass particle depositing device as employed in the comparative example 1, the reciprocating movement was made in a pattern as shown in FIG. 1. The starting rod 1 was moved 40 mm downward, and then 20 mm upward, so that the turn-back location of reciprocating movement was moved by every 20 mm downward. After the turn-back location was moved downward by an amount of burner interval, the downward movement distance was kept at 40 mm, and the upward movement distance was made 60 mm, whereby the turn-back location was moved upward by every 20 mm, until it was returned to the initial position, which operation was defined as one set. The glass particles were deposited by repeating 200 sets under the same conditions as in the comparative example 1. The produced glass particle deposited body had a total length of 900 mm, and an outer diameter of 240 mm. The effective portion had a length of 500 mm, and the taper portion at either end portion had a length of 200 mm. Though the length of the effective portion was unchanged as compared with the comparative example 1, the length of the ineffective portion (taper portion) was shorter by 100 mm at either end portion.

Example 2

The glass particles were deposited with a burner interval of 260 mm under the same conditions as in the example 1, so that the glass particle deposited body having the roughly same length as in the comparative example 1 was produced. In the same manner as in the example 1, the starting rod 1 was moved 40 mm downward, and then 20 mm upward, so that the turn-back location of reciprocating movement was moved by every 20 mm downward. After the turn-back location was moved downward by an amount of burner interval, the downward movement distance was kept at 40 mm, and the upward movement distance was made 60 mm, so that the turn-back location was moved upward by every 20 mm, until it was returned to the initial position, which operation was defined as one set. The glass particles were deposited by repeating 200 sets. The produced glass particle deposited body had a total length of 1140 mm, the taper portion at either end portion had a length of 200 mm, and the effective portion had a length of 740 mm. If the burner interval is adjusted to produce the glass particle deposited body having the same length with the same number of burners, the method of the invention allows the length of the effective portion to be longer.

Example 3

Figure 5:
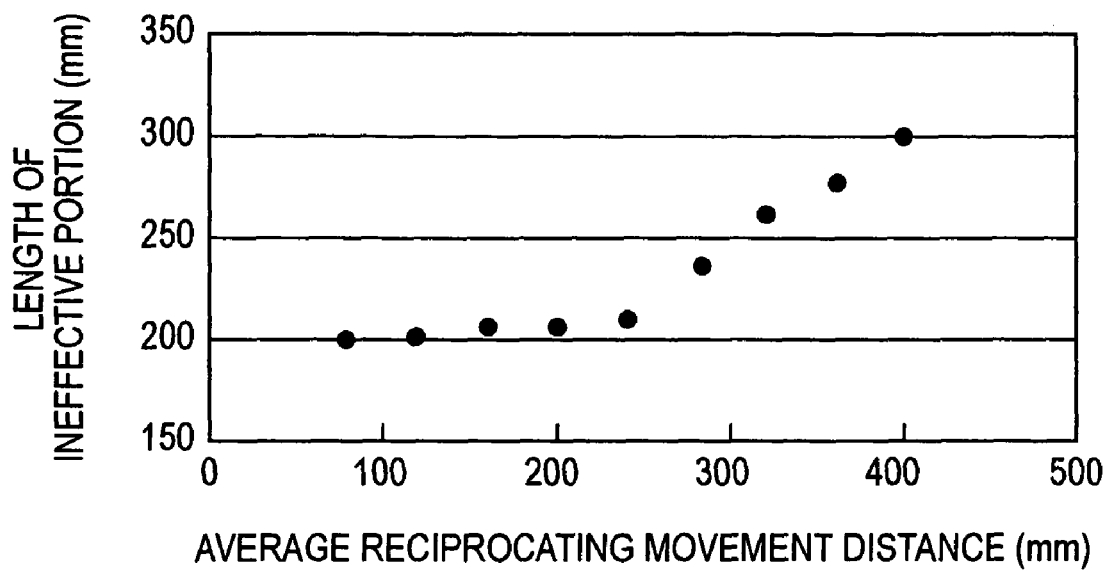
FIG. 5 is a graph showing the relationship between the average reciprocating movement distance and the ineffective portion length in an example 3.

The movement distance of the turn-back location is Amm, and the reciprocating movement with the outward path $(B+1) \times A$ and the homeward path $B \times A$ is repeated. After the turn-back location is moved by an amount of burner interval, the outward path is kept at $(B+1) \times A$, but the homeward path is made $(B+2) \times A$. The turn-back location is moved in the reverse direction, until the turn-back location is returned to the initial position. A series of reciprocating movements is defined as one set. The glass particles are deposited by repeating one set of operation. At this time, the average reciprocating movement D is $D=2 \times (B+1) \times A$ mm ($B=1, 2, 3, \ldots$). The glass particle deposited body having an outer diameter of 240 mm is fabricated under the same conditions (burner interval, starting rod diameter, etc.) as in the example 1 as well as $A=20$ mm. At this time, the relationship between the change of B and the length of the ineffective portion is as follows. That is, the average reciprocating movement D is 80, 120, 160, 200, 240, 280, 320, 360 or 400 mm and the length of the ineffective portion is 200, 202, 207, 205, 210, 238, 262, 278 or 300 mm, when B is 1, 2, 3, 4, 5, 6, 7, 8 or 9. This situation is shown in FIG. 5.

Herein, $B=9$ and $D=400$ is the same case as with the conventional technique. At this point, the length of the ineffective portion is shortest in the conventional technique. In the range from $B=1$ to 8 that is smaller than $B=9$, the ineffective portion shorter than the shortest length of the ineffective portion in the conventional technique was realized. Further, it is converged to more or less 200 mm for $D \leqq 240$.

Example 4

Figure 6:
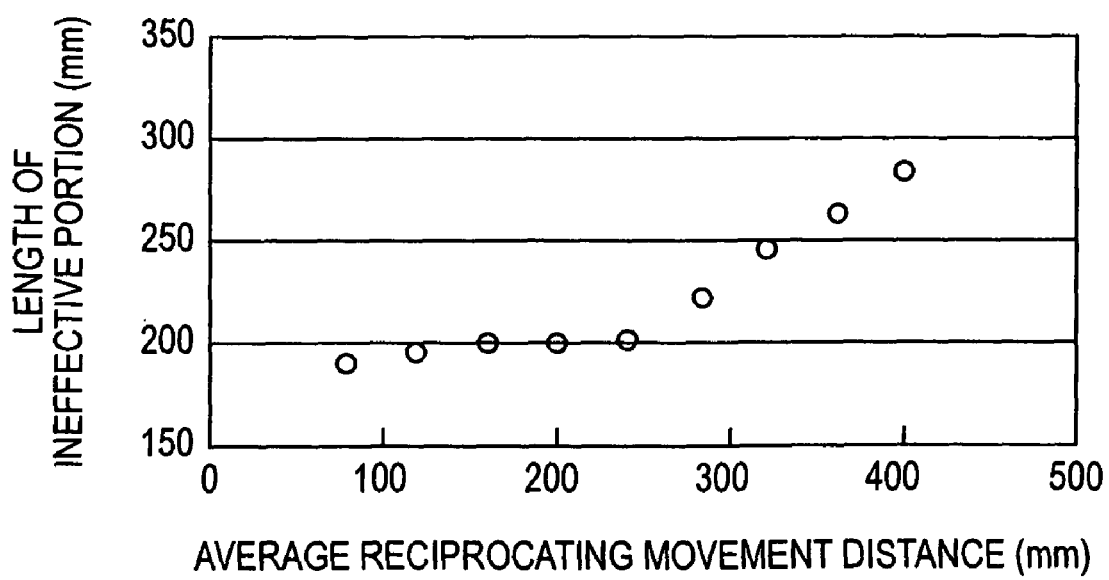
FIG. 6 is a graph showing the relationship between the average reciprocating movement distance and the ineffective portion length in an example 4.

The movement distance of the turn-back location is Amm, and the reciprocating movement with the outward path $(B+1) \times A$ and the homeward path $B \times A$ is repeated. The turn-back location is moved to a position far from the initial position by a distance of the burner interval minus A. Thereafter, the burner is returned to the initial position in the next movement. This series of reciprocating movements is defined as one set. The glass particles are deposited by repeating one set of operation. At this time, the average reciprocating movement D is $D=2 \times (B+1) \times A$ mm ($B=1, 2, 3, \ldots$). The glass particle deposited body having a parent material outer diameter of 240 mm is fabricated under the same conditions (burner interval, starting rod diameter, etc.) as in the example 1 as well as $A=20$ mm. At this time, the relationship between the change of B and the length of the ineffective portion is as follows. That is, the average reciprocating movement D is 80, 120, 160, 200, 240, 280, 320, 360 or 400 mm, and the length of the ineffective portion is 195, 199, 202, 206, 207, 223, 245, 260 or 280 mm, when B is 1, 2, 3, 4, 5, 6, 7, 8 or 9. This situation is shown in FIG. 6.

The effect of reducing the ineffective portion is greater than in the example 3, because the principal taper length is shorter by Amm for the same average movement distance. Further, it is converged to more or less 200 mm for $D \leqq 240$.

In the method of the invention, the average reciprocating movement distance in one set is less than double the burner interval, and the turn-back location is moved every time of reciprocating movement, whereby the movement distance on the outward and homeward paths is not integral multiple of the burner interval in one set of reciprocating movements.

The method of the invention has the following advantages over the conventional technique.

First of all, in the case where the turn-back point is dispersed at an equal interval over the entire length of the glass particle deposited body according to the invention and the conventional technique, the total number of deposited layers on the stationary portion in the oscillatory reciprocating movement of one set is always smaller in the invention than the conventional technique. That is, the target weight is achieved at the higher precision. Further, the length of the ineffective portion formed at either end of the glass particle deposited body is always shorter in this invention. That is, the deposition efficiency is improved. Moreover, though the ineffective portion at either end of the glass particle deposited body is longer in proportion to the burner interval in the conventional technique, the length of the ineffective portion can be minimized irrespective of the distance of burner interval in the optimal embodiment of the invention. In other words, even if the burner interval is longer, and the glass particle deposited body is larger, the length of the ineffective portion can be minimized.

INDUSTRIAL APPLICABILITY

With this invention, the taper portion formed at the end portion of the glass particle deposited body is reduced without increasing the number of burners. Further, the weight of the glass particle deposited body is easily adjusted.

[FIGS. 1, 2, 3, 4, 8]
1: Starting rod
2: Outside burner
3: Second burner
A: Burner interval
B: Relative position change over time
C: Number of deposited layers

[FIGS. 5, 6]
A: Length of ineffective portion
B: Average reciprocating movement distance

Figure 7:
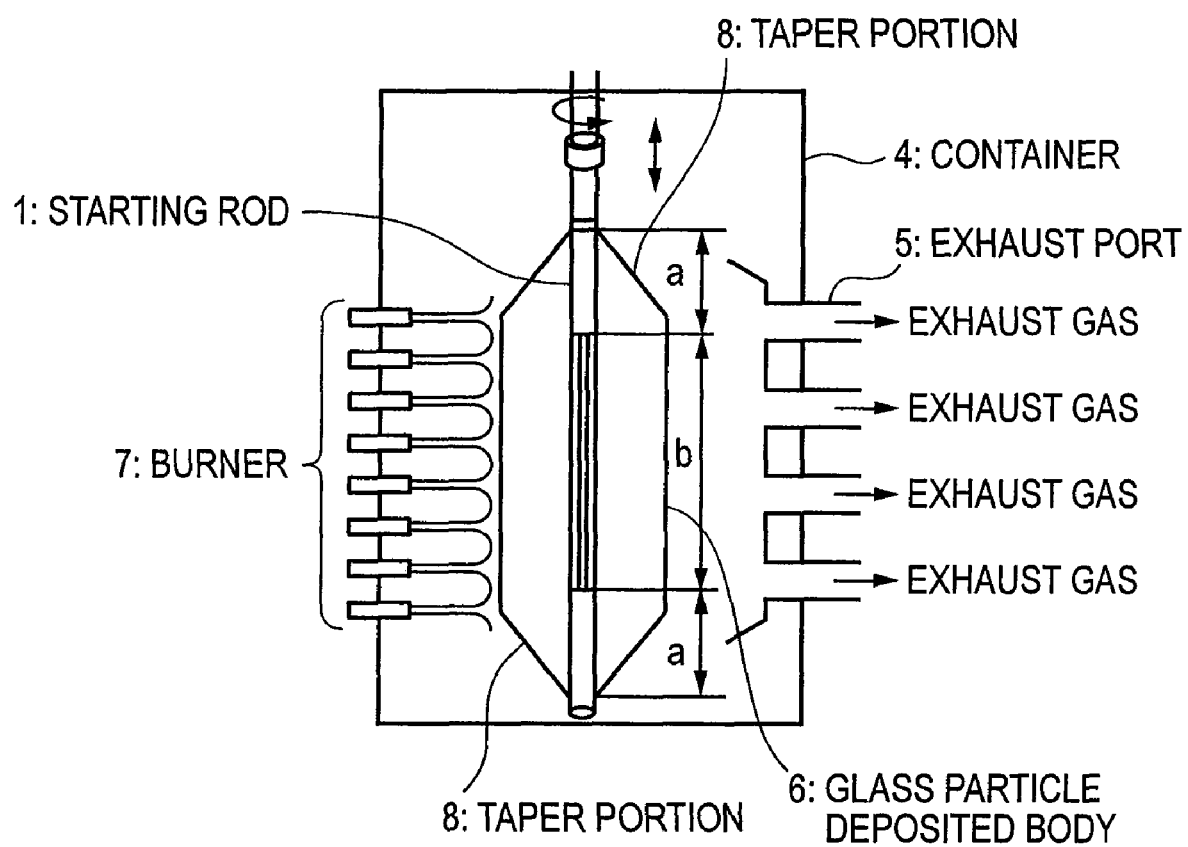
FIG. 7 is an explanatory view showing the outline of manufacturing a glass particle deposited body by depositing glass particles.

[FIG. 7]
1: Starting rod
4: Container
5: Exhaust port
6: Glass particle deposited body
7: Burner
8: Taper portion
A: Exhaust gas

The invention claimed is:
1. A glass particle deposited body manufacturing method for manufacturing a glass particle deposited body, in which a plurality of glass particle synthesizing burners are arranged at regular intervals to be opposed to a rotating starting rod, comprising the steps of:

relatively reciprocating said starting rod and said glass particle synthesizing burners in parallel in such a manner that a turn-back location from a homeward path to an outward path does not go beyond the initial position to move a turn-back location from an outward path to a homeward path of reciprocating movement in a certain direction, and move said turn-back location in the reverse direction if said turn-back location from an outward path to a homeward path is moved to a predetermined position, until each burner is returned to an initial position, which operation is defined as one set of operation, sequentially these operations being repeated so that glass particles synthesized by burners are deposited sequentially on a surface of the starting rod, with reciprocating movement of outward path of $(B+1)+A$ and homeward path of $B \times A$, (A: movement distance at once at a turn-back location, B: integer $(1, 2, 3, \ldots)$), and reciprocating movement of outward path of $(B+1) \times A$ and homeward path of $(B+2) \times A$ in reverse direction after the turn-back location moves to the predetermined position, and with an average reciprocating movement distance $D = 2 \times (B+1) \times A$ of said one set being less than double a burner-to-burner interval, setting the number of deposited layers on a stationary portion to be uniform along a length direction at the time when each burner of said one set returns to the initial position.

2. A glass particle deposited body manufacturing method for manufacturing a glass particle deposited body, in which a plurality of glass particle synthesizing burners are arranged at regular intervals to be opposed to a rotating starting rod, comprising the steps of:

relatively reciprocating said starting rod and said glass particle synthesizing burners in parallel in such a manner that a turn-back location from a homeward path to an outward path does not go beyond the initial position to move a turn-back location from an outward path to a homeward path of reciprocating movement in a certain direction, and move said turn-back location in the reverse direction if said turn-back location from an outward path to a homeward path is moved to a predetermined position, until each burner is returned to an initial position, which operation is defined as one set of operation, sequentially these operations being repeated so that glass particles synthesized by burners are deposited sequentially on a surface of the starting rod, with a series of reciprocating including repeating reciprocating movement of outward path of $(B+1) \times A$ and homeward path of $B \times A$, (A: movement distance at once at a turn-back location, B: integer $(1, 2, 3, \ldots)$), and returning to the initial location in a next movement after the turn-back location moves to the predetermined position being defined as one set, and with an average reciprocating movement distance $D = 2 \times (B+1) \times A$ of said one set being less than double a burner-to-burner interval, setting the number of deposited layers on a stationary portion to be uniform along a length direction at the time when each burner of said one set returns to the initial position.

3. A glass particle deposited body manufacturing method for manufacturing a glass particle deposited body, in which a plurality of glass particle synthesizing burners are arranged at regular intervals to be opposed to a rotating starting rod, comprising the steps of:

relatively reciprocating said starting rod and said glass particle synthesizing burners in parallel in such a manner that a turn-back location from a homeward path to an outward path does not go beyond the initial position to move a turn-back location from an outward path to a homeward path of reciprocating movement in a certain direction, and move said turn-back location in the reverse direction if said turn-back location from an outward path to a homeward path is moved to a predetermined position, until each burner is returned to an initial position, which operation is defined as one set of operation, sequentially these operations being repeated so that glass particles synthesized by burners are deposited sequentially on a surface of the starting rod, with a series of reciprocating including a first movement of moving to the predetermined position, and then repeating reciprocating movement of homeward path of $(B+1) \times A$ and outward path of $B \times A$, (A: movement distance at once at a turn-back location, B: integer $(1, 2, 3, \ldots)$), and returning to the initial location being defined as one set, and with an average reciprocating movement distance $D = 2 \times (B+1) \times A$ of said one set being less than double a burner-to-burner interval, setting the number of deposited layers on a stationary portion to be uniform in the reciprocating movement at the time when each burner of said one set returns to the initial position.

4. A glass particle deposited body manufacturing method for manufacturing a glass particle deposited body, in which a plurality of glass particle synthesizing burners are arranged at regular intervals to be opposed to a rotating starting rod, comprising the steps of:

relatively reciprocating said starting rod and said glass particle synthesizing burners in parallel in such a manner that a turn-back location from a homeward path to an outward path does not go beyond the initial position to move a turn-back location from an outward path to a homeward path of reciprocating movement in a certain direction, and move said turn-back location in the reverse direction if said turn-back location from an outward path to a homeward path is moved to a predetermined position, until each burner is returned to an initial position, which operation is defined as one set of operation, sequentially these operations being repeated so that glass particles synthesized by burners are deposited sequentially on a surface of the starting rod, with a series of reciprocating including repeating reciprocating movement of outward path of $(B+1) \times A$ and homeward path of $B \times A$, (A: movement distance at once at a turn-back location, B: integer $(1, 2, 3, \ldots)$), and returning to a position shorter than a burner-to-burner interval by A and returning to the initial position by a next movement being defined as one set, and with an average reciprocating movement distance $D = 2 \times (B+1) \times A$ of said one set being less than double a burner-to-burner interval, setting the number of deposited layers on a stationary portion to be uniform along a length direction at the time when each burner of said one set returns to the initial position.

5. A glass particle deposited body manufacturing method for manufacturing a glass particle deposited body, in which a plurality of glass particle synthesizing burners are arranged at regular intervals to be opposed to a rotating starting rod, comprising the steps of:

relatively reciprocating said starting rod and said glass particle synthesizing burners in parallel in such a manner that a turn-back location from a homeward path to an outward path does not go beyond the initial position to move a turn-back location from an outward path to a homeward path of reciprocating movement in a certain direction, and move said turn-back location in the reverse direction if said turn-back location from an outward path to a homeward path is moved to a predetermined position, until each burner is returned to an initial position, which operation is defined as one set of operation, sequentially these operations being repeated so that glass particles synthesized by burners are deposited sequentially on a surface of the starting rod, with a series of reciprocating including a first movement of moving to the predetermined position, and then repeating reciprocating movement of homeward path of (B+1)×A and outward path of B×A, (A: movement distance at once at a turn-back location, B: integer (1, 2, 3, . . . )) being defined as one set, and with an average reciprocating movement distance D=2× (B+1)×A of said one set being less than double a burner-to-burner interval, setting the number of deposited layers on a stationary portion to be uniform along a length direction at the time when each burner of said one set returns to the initial position.

6. The glass particle deposited body manufacturing method according to claim 1, wherein said turn-back location of reciprocating movement has a movement range of about n (n is an integer from 1 to 3) times the burner interval.

7. The glass particle deposited body manufacturing method according to claim 2, wherein said turn-back location of reciprocating movement has a movement range of about n (n is an integer from 1 to 3) times the burner interval shorter by the minimum movement distance of the turn-back location in the one set of operation.

8. The glass particle deposited body manufacturing method according to claim 3, wherein said turn-back location of reciprocating movement has a movement range of about n (n is an integer from 1 to 3) times the burner interval shorter by the minimum movement distance of the turn-back location in the one set of operation.

9. The glass particle deposited body manufacturing method according to claim 4, wherein said turn-back location of reciprocating movement has a movement range of about n (n is an integer from 1 to 3) times the burner interval shorter by the minimum movement distance of the turn-back location in the one set of operation.

10. The glass particle deposited body manufacturing method according to claim 5, wherein said turn-back location of reciprocating movement has a movement range of about n (n is an integer from 1 to 3) times the burner interval shorter by the minimum movement distance of the turn-back location in the one set of operation.

11. The glass particle deposited body manufacturing method according to claim 1, wherein the average movement distance of said turn-back location of reciprocating movement each time in said one set of operation is about one−(m+1)th (m is a natural number) the burner interval.

12. The glass particle deposited body manufacturing method according to claim 2, wherein the average movement distance of said turn-back location of reciprocating movement each time in said one set of operation is about one−(m+1)th (m is a natural number) the burner interval.

13. The glass particle deposited body manufacturing method according to claim 3, wherein the average movement distance of said turn-back location of reciprocating movement each time in said one set of operation is about one−(m+1)th (m is a natural number) the burner interval.

14. The glass particle deposited body manufacturing method according to claim 4, wherein the average movement distance of said turn-back location of reciprocating movement each time in said one set of operation is about one−(m+1)th (m is a natural number) the burner interval.

15. The glass particle deposited body manufacturing method according to claim 5, wherein the average movement distance of said turn-back location of reciprocating movement each time in said one set of operation is about one−(m+1)th (m is a natural number) the burner interval.

16. The glass particle deposited body manufacturing method according to claim 11, wherein assuming the average movement distance of said turn-back location of reciprocating movement each time in said one set of operation is Amm, and the average reciprocating movement distance in said one set of operation is Dmm, A falls within a range of 5 to 60 mm, and D falls within a range of $4 \times A < D < 240$.

17. The glass particle deposited body manufacturing method according to claim 12, wherein assuming the average movement distance of said turn-back location of reciprocating movement each time in said one set of operation is Amm, and the average reciprocating movement distance in said one set of operation is Dmm, A falls within a range of 5 to 60 mm, and D falls within a range of $4 \times A < D < 240$.

18. The glass particle deposited body manufacturing method according to claim 13, wherein assuming the average movement distance of said turn-back location of reciprocating movement each time in said one set of operation is Amm, and the average reciprocating movement distance in said one set of operation is Dmm, A falls within a range of 5 to 60 mm, and D falls within a range of $4 \times A < D < 240$.

19. The glass particle deposited body manufacturing method according to claim 14, wherein assuming the average movement distance of said turn-back location of reciprocating movement each time in said one set of operation is Amm, and the average reciprocating movement distance in said one set of operation is Dmm, A falls within a range of 5 to 60 mm, and D falls within a range of $4 \times A < D < 240$.

20. The glass particle deposited body manufacturing method according to claim 15, wherein assuming the average movement distance of said turn-back location of reciprocating movement each time in said one set of operation is Amm, and the average reciprocating movement distance in said one set of operation is Dmm, A falls within a range of 5 to 60 mm, and D falls within a range of 4×A<D<240.

21. The glass particle deposited body manufacturing method according to claim 1, wherein
the reciprocating movement speed at which a target deposition amount of glass particles is achieved at said glass particle deposition end time is decided from the relationship between the reciprocating movement speed and the weight of glass particles deposited by the glass particle deposition end time, and said target deposition amount is achieved at said glass particle deposition end time by depositing glass particles at said decided speed.

22. The glass particle deposited body manufacturing method according to claim 2, wherein
the reciprocating movement speed at which a target deposition amount of glass particles is achieved at said glass particle deposition end time is decided from the relationship between the reciprocating movement speed and the weight of glass particles deposited by the glass particle deposition end time, and said target deposition amount is achieved at said glass particle deposition end time by depositing glass particles at said decided speed.

23. The glass particle deposited body manufacturing method according to claim 3, wherein
the reciprocating movement speed at which a target deposition amount of glass particles is achieved at said glass particle deposition end time is decided from the relationship between the reciprocating movement speed and the weight of glass particles deposited by the glass particle deposition end time, and said target deposition amount is achieved at said glass particle deposition end time by depositing glass particles at said decided speed.

24. The glass particle deposited body manufacturing method according to claim 4, wherein
the reciprocating movement speed at which a target deposition amount of glass particles is achieved at said glass particle deposition end time is decided from the relationship between the reciprocating movement speed and the weight of glass particles deposited by the glass particle deposition end time, and said target deposition amount is achieved at said glass particle deposition end time by depositing glass particles at said decided speed.

25. The glass particle deposited body manufacturing method according to claim 5, wherein
the reciprocating movement speed at which a target deposition amount of glass particles is achieved at said glass particle deposition end time is decided from the relationship between the reciprocating movement speed and the weight of glass particles deposited by the glass particle deposition end time, and said target deposition amount is achieved at said glass particle deposition end time by depositing glass particles at said decided speed.

26. A glass parent material manufacturing method for manufacturing a glass parent material, comprising the steps of:
producing a glass particle deposited body by the glass particle deposited body manufacturing method according to claim 1, and
heating and vitrifying said produced glass particle deposited body to manufacture the glass parent material.

27. A glass parent material manufacturing method for manufacturing a glass parent material, comprising the steps of:
producing a glass particle deposited body by the glass particle deposited body manufacturing method according to claim 2, and
heating and vitrifying said produced glass particle deposited body to manufacture the glass parent material.

28. A glass parent material manufacturing method for manufacturing a glass parent material, comprising the steps of:
producing a glass particle deposited body by the glass particle deposited body manufacturing method according to claim 3, and
heating and vitrifying said produced glass particle deposited body to manufacture the glass parent material.

29. A glass parent material manufacturing method for manufacturing a glass parent material, comprising the steps of:
producing a glass particle deposited body by the glass particle deposited body manufacturing method according to claim 4, and
heating and vitrifying said produced glass particle deposited body to manufacture the glass parent material.

30. A glass parent material manufacturing method for manufacturing a glass parent material, comprising the steps of:
producing a glass particle deposited body by the glass particle deposited body manufacturing method according to claim 5, and
heating and vitrifying said produced glass particle deposited body to manufacture the glass parent material.

* * * * *